United States Patent Office 3,000,389
Patented Sept. 19, 1961

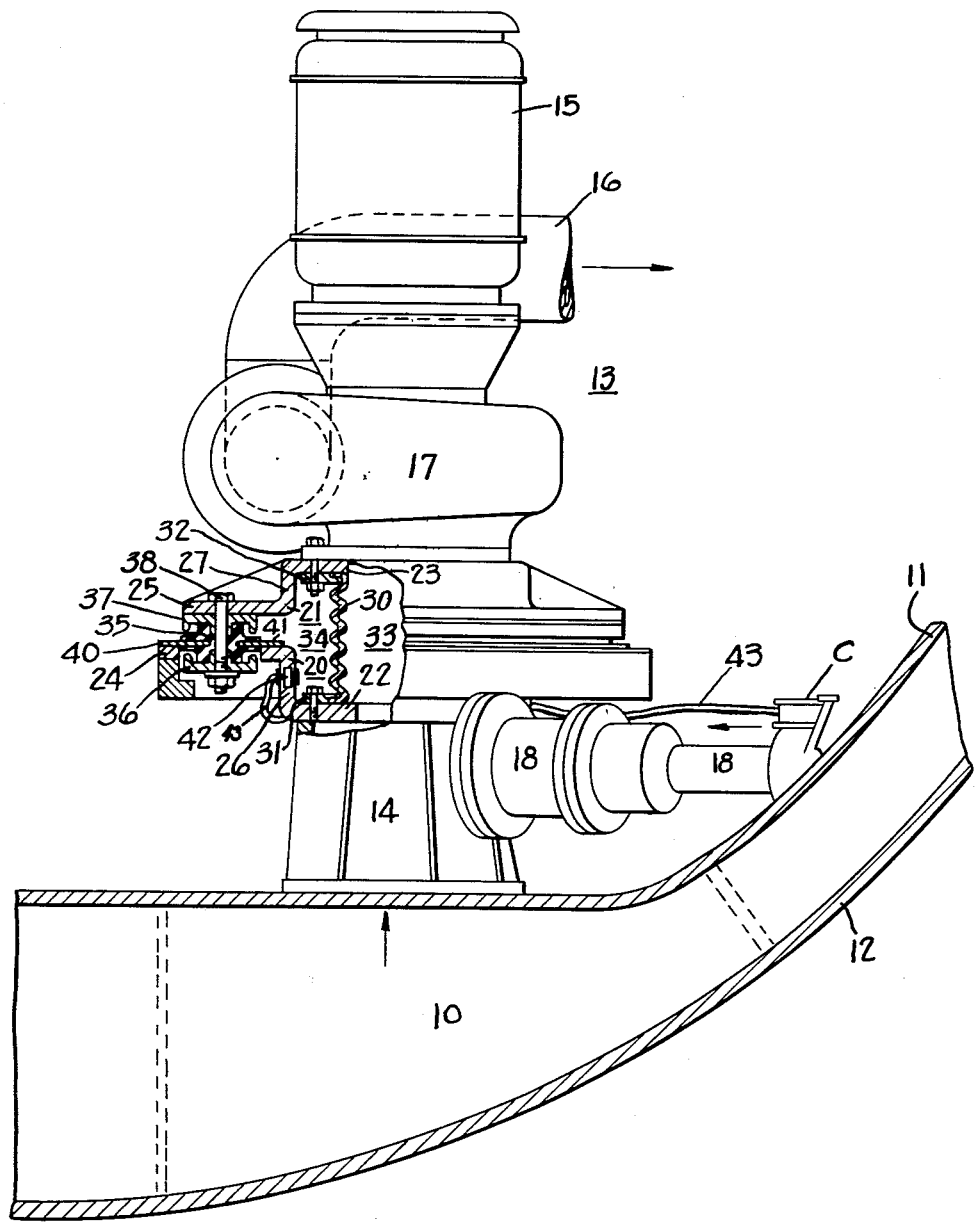

3,000,389
CONTROL MEANS COMPRISING A RESILIENT COUPLING FOR COOLING SYSTEM ELEMENTS
Leslie E. Alsager, Falls Church, Va., and Edward S. Sheridan, Takoma Park, Md., assignors to the United States of America as represented by the Secretary of the Navy
Filed May 27, 1960, Ser. No. 32,492
2 Claims. (Cl. 137—68)
(Granted under Title 35, U.S. Code (1952), sec. 266)

The invention described herein may be manufactured and used by or for the Government of the United States of America for governmental purposes without the payment of any royalties thereon or therefor.

This invention relates to vibration dampening and is principally concerned with arrangements for mounting machinery components of water circulating systems used in ships and particularly naval vessels.

The problem of deflection reactions in the ship's structure due to the vibrational effect of machinery components, for example those used in the ship's cooling system or in the propulsion system, has been in existence for long periods of time and various arrangements for installing the machinery components have been resorted to in the past to reduce deflections or distortions of the ship's structure.

As is well known, the machinery components of a vessel, such as the generator, turbine, condenser, etc., are fixedly supported in the hull structure of the ship and the conduit or piping systems interconnecting the various machinery components have been such as to take up or reduce the vibrational effect of circulated fluids. Because of lack of space, the conduit or piping systems have taken various curved or coiled designs in order to be accommodated within the utilizable space. This is particularly true of submarines, for which the present invention has especial application. Failures in the fluid circulating systems often occur due to leakage in piping or conduit connections with the machinery components which is caused principally by the contractive and expansive movements of the piping or conduits.

In its broad aspect, the present invention is directed to the provision of a flexible coupling arrangement which is located between two machinery components of a fluid circulating system which permits relative movement between the members in order to take up or allow for the contractive and expansive movements of the assembled structures.

In another aspect, the invention contemplates a connection between a fixed and movable component of a fluid circulating system which permits freedom of movement of the structure in order to prevent damage thereto.

In its more narrow aspects, the invention is directed to a flexible jointure between an assembly of a fixed valve and pump supported thereby of a cooling system which is so designed as to permit movement of the pump and associated piping relative to the valve under conditions of stress and to provide for the proper functioning of the structure.

The invention contemplates two cooperating elements of a fluid circulating system wherein it is essential for proper functioning of the system that one of the elements can move relative to the other without deleteriously affecting the operation. Necessarily, one of the elements will be stationary and fixed to the ship's hull while the other element will be in direct fluid communication with the fixed element to convey fluid to other elements in the system. The apparatus of the invention provides an inner pressure sealed passageway formed by a resilient ring which is fixedly mounted between the cooperating elements and an outer compartment adjacent the inner passageway. The outer compartment is formed with the resilient ring by the provision of an outer resilient ring which is disposed between the cooperating elements in a manner to provide a liquid seal. An incidental feature of the invention is the provision of device for showing pressure change in the outer compartment which is indicative of improper operation of the coupling structure.

The single figure of the drawings shows the invention applied to a valve and pump structure assembly mounted within a submarine hull with portions of the assembled elements sectioned in order to show details.

Referring to figure, 10 indicates a portion of the pressure tank or sea chest of a submarine which is formed between the submarine hull 11 and the superstructure 12. The pump and valve assembly is shown generally at 13 and is made up of the valve structure 14, pump structure 15, inlet conduit 16 for supplying water from the sea chest 10 to, for example, a heat exchange unit such as a condenser (not shown) and an outlet conduit 17 for removal of water from the heat exchange unit.

No details of the valve structure is necessary for the purpose of understanding the invention but it may be assumed that a valve gate is located within the valve structure which may be hydraulically operated through the fluid conduits 18 and its operation regulated by means of a controller C. Likewise, details of the pump structure are not necessary to an understanding of the invention but it will be assumed that water is supplied to the heat exchange unit or condenser from the sea chest 10 when pump 15 is operating and the valve 14 is open to convey the water through the heat exchange unit or condenser and other elements of the cooling system which are not shown.

The details of the coupling arrangement of the invention are shown in the sectioned portion of the figure and comprise similar walls 20 and 21 each having a central aperture for the passage of water between the valve and pump. Inwardly extending flanges 22 and 23 and outwardly extending flanges 24 and 25 are provided on the respective walls. The flanges of wall 20 are disposed in different planes by a spacing section 26 while the flanges of wall 21 are disposed in different planes by a spacing section 27. The walls 20 and 21 are disposed in opposed relationship, as shown, and a resilient bellows ring 30 is positioned between the walls and has its ends fixed to the inner flanges This is preferably accomplished by means of locking rings 31 and 32 and the shown threaded connections to form an inner passageway 33.

An outer compartment 34 is formed with the resilient ring 30 by means of a resilient or compressible ring 35 of rubber or rubber-like material which functions to provide a watertight seal for the assembly. The ring is further arranged to function as a snubbing element in checking the relative movement between the walls 20 and 21. To this end, the ring 35 is secured between pairs of cooperating annular snubbing elements 36 and 37. Each element 36 and 37 is groovular and one element 37, for example, is secured to the upper flange 25 which in turn supports the other element 36 to which it is fixed by means of bolt connections 38. The lower flange is split circumferentially to permit movement of the ring 35 and associated element 36 and the ring 35 is provided with metallic spring rings 40 and 41 for securement to the respective edges of the split flange 24 to thereby form a rigid structure.

A pressure sensing element shown generally at 42 is connected by line 43 to the controller C and is operative to close the valve upon predetermined pressure change in compartment 34 in case the bellows ring 30 becomes ruptured.

It will be apparent to those skilled in the art that various changes may be made to the present disclosure without departing from the spirit of the invention or from the scope of the appended claims.

What is claimed is:

1. Apparatus for the delivery of liquid to a heat exchange system of a ship, said apparatus comprising valve structure supported by a liquid supply tank within the ship, said valve structure forming a valved inlet passageway communicating through its lower end with said tank and having an annular outer flange at its upper end, pump structure positioned above the valve structure forming an outlet passageway for communication with the heat exchange system and having an annular outer flange at its lower end, said annular flanges being generally similar and disposed in alignment, a resilient annular spacer between said annular flanges, means including clamping means for securing the flanges together to permit vibrational movement of the pump structure relative to the valve structure, a tubular bellows partition fixedly secured between said annular outer flanges forming an inner connecting passageway between the valve and pump passageways and an outer compartment with said resilient ring, means for closing the valved inlet passageway when the bellows becomes ruptured and pressure increases in the outer compartment, said means comprising a controller for the valved passageway, a pressure sensing element in said outer compartment and connections between said sensing element and said controller.

2. Apparatus for the delivery of liquid to a heat exchange system of a ship, said apparatus comprising valve structure supported by a liquid supply tank within the ship, said valve structure forming a valved inlet passageway communicating through its lower end with said tank and having an annular outer flange at its upper end, pump structure positioned above the valve structure forming an outlet passageway for communication with the heat exchange system and having an annular outer flange at its lower end, said annular flanges being generally similar and disposed in alignment, a resilient annular spacer between said annular flanges, means carried by the upper flange for fixedly securing the spacer thereto, means carried by the lower flange for resiliently mounting the spacer thereto, said last mentioned means and spacer permitting vibrational movement of the pump structure relative to the valve structure, a tubular bellows partition fixedly secured between said annular outer flanges forming an inner connecting passageway between the valve and pump passageways and an outer compartment with said resilient ring, means for closing the valved inlet passageway when the bellows becomes ruptured and pressure increases in the outer compartment, said means comprising a controller for the valved passageway, a pressure sensing element in said outer compartment and connections between said sensing element and said controller.

References Cited in the file of this patent

UNITED STATES PATENTS

| | | |
|---|---|---|
| 2,014,355 | Hussman | Sept. 10, 1935 |
| 2,335,478 | Bergman | Mar. 30, 1943 |